(12) United States Patent
Knapp

(10) Patent No.: US 6,220,425 B1
(45) Date of Patent: Apr. 24, 2001

(54) BUCKET ELEVATOR

(75) Inventor: Dorcel Warren Knapp, Laurel, MS (US)

(73) Assignee: The Essmueller Company, Inc., Laurel, MS (US)

( * ) Notice: Subject to any disclaimer, the term of this patent is extended or adjusted under 35 U.S.C. 154(b) by 0 days.

(21) Appl. No.: 09/553,136

(22) Filed: Apr. 19, 2000

(51) Int. Cl.$^7$ .................................................. B65G 17/36

(52) U.S. Cl. ........................................ 198/709; 198/815

(58) Field of Search ............................... 198/709, 710, 198/815

(56) References Cited

U.S. PATENT DOCUMENTS

| | | | | |
|---|---|---|---|---|
| 2,494,165 | * | 1/1950 | Diebold | 198/709 X |
| 2,588,864 | * | 3/1952 | Mercier | 198/815 X |
| 4,033,451 | * | 7/1977 | Kelsall | 198/815 |

* cited by examiner

Primary Examiner—James R. Bidwell
(74) Attorney, Agent, or Firm—Thomas S. Baker, Jr.

(57) ABSTRACT

A boot-driven bucket elevator apparatus for bulk material handling is provided with a boot pulley drive and take-up which effects rotation of the apparatus co-operating bucket endless belt, which is platform lever-mounted, and which automatically effects proper tensioning and centering of the apparatus endless belt by the gravitational weight of the drive and take-up.

4 Claims, 3 Drawing Sheets

BUCKET ELEVATOR

CROSS-REFERENCES

None.

FIELD OF THE INVENTION

This invention pertains generally to bulk material handling equipment, and particularly concerns boot-driven bucket elevator apparatus as distinguished from head-driven bucket elevator apparatus.

BACKGROUND OF THE INVENTION

Bucket elevator apparatus utilized for lifting granular bulk materials such as food grains for storage or for other processing may be generally classified as being either head-driven or boot-driven in their principal mode of operation. Each elevator category typically includes a vertically-oriented endless belt which co-operates both with an upper pulley and with a lower pulley, and to which are attached multiple, spaced-apart, material-carrying bucket elements. The elevator primary drive is operatively connected to the upper pulley in the case of head-driven bucket elevators and to the lower pulley in the case of boot-driven bucket elevators. A suitable housing with supply and discharge openings encloses the bucket elevator pulleys, endless belt, and attached material-carrying buckets.

Heretofore, the type of bucket elevator preferred in the United States has been the head-driven type with the apparatus primary drive being operatively connected to the elevator upper pulley. However, in instances when large vertical-movement distances are involved and the apparatus primary drive is located at a substantial height above ground, accessibility to the drive mechanism for maintenance servicing or replacement is significantly reduced and is to be avoided.

With respect to boot-driven bucket elevator apparatus, substantial belt slippage, belt tensioning control, and belt-to-pulley alignment problems have heretofore been encountered, especially when high rates of material movement (e.g., 32,000 bushels of grain per hour) or large vertical material-movement distances (e.g., 300 vertical feet) are involved. One known, albeit unnecessarily complex, apparatus resolution to such bucket elevator needs is the boot pulley hydraulic drive with included creep-drive and belt take-up features that is disclosed and claimed in U.S. Pat. No. 4,799,584 issued in the name of Hartsuiker, et al.

Accordingly, a principal objective of the present invention is to provide a bucket elevator having a boot pulley with a boot pulley primary drive with a take-up that obtains simplified belt tensioning control and consequential reductions in belt slippage and belt slippage heat generation, belt wear, belt-to-pulley misalignment, cost of elevator manufacture, and cost of elevator drive maintenance servicing and replacement.

Other objects and advantages of the present invention will become apparent from a consideration of the descriptions, drawings, and claims which follow.

SUMMARY OF THE INVENTION

The bucket elevator apparatus of the present invention is basically comprised of an upper or head pulley element, a lower or boot pulley element, an endless belt element having attached spaced-apart material-carrying bucket elements and co-operating with both pulley elements, a housing enclosing the foregoing elements, and a primary drive operatively connected to the lower or boot pulley element. The primary drive includes an electric motor, a coupling mechanically joining the output shaft of the electric motor to the shaft of the apparatus boot pulley element, floating bearing elements supporting the shaft of the boot pulley element, a boot fulcrum element, and a platform-like boot lever element co-operating with the boot fulcrum element, the electric motor element, and the floating bearing elements in a manner whereby the weight of the electric motor element continuously applies gravitational tensioning forces to the drive floating bearing elements, the boot pulley element, and the apparatus endless belt element.

DETAILED DESCRIPTION

Figure 1:
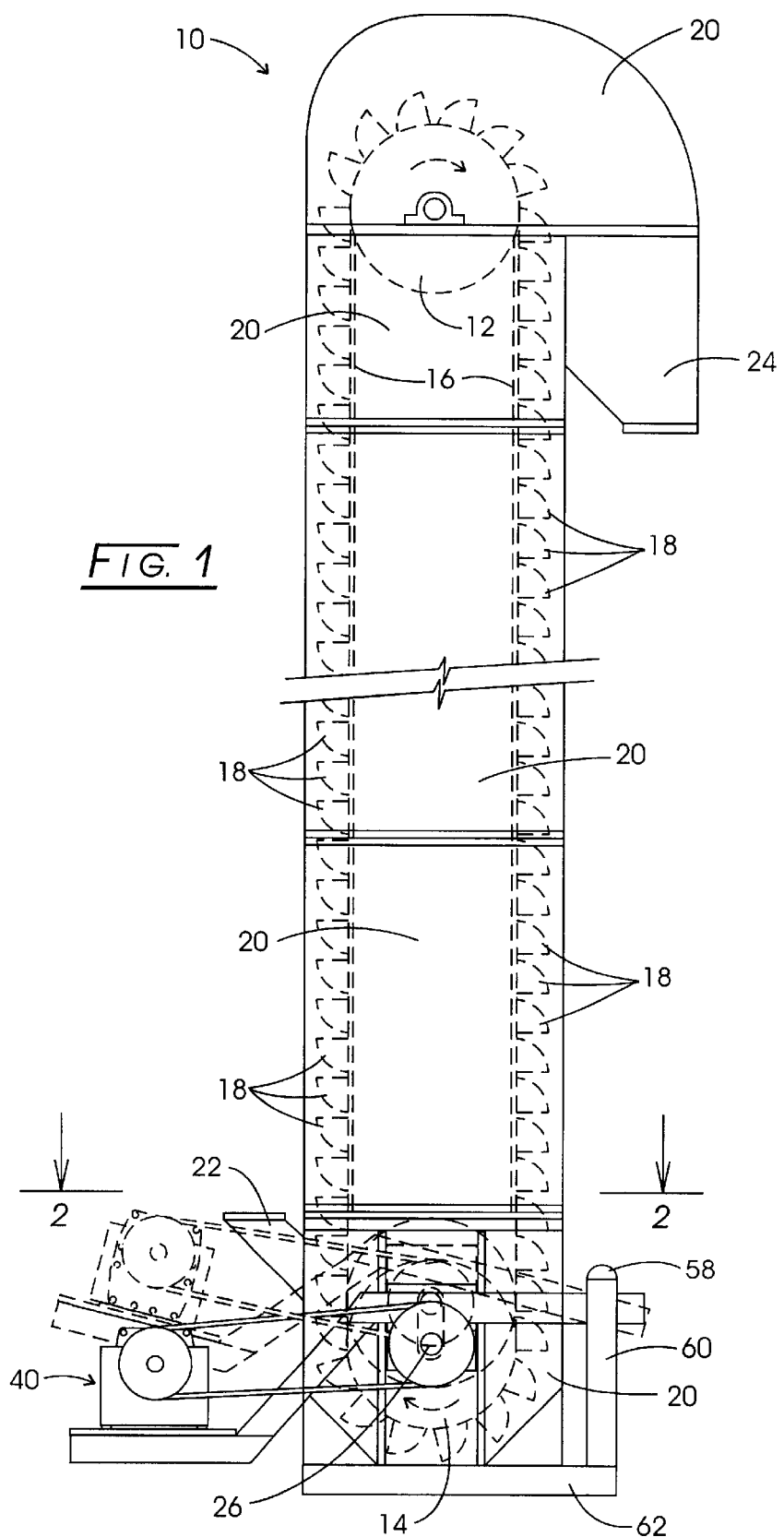
FIG. 1 is a side elevation view of a preferred embodiment of the bucket elevator apparatus of the present invention.
Figure 2:
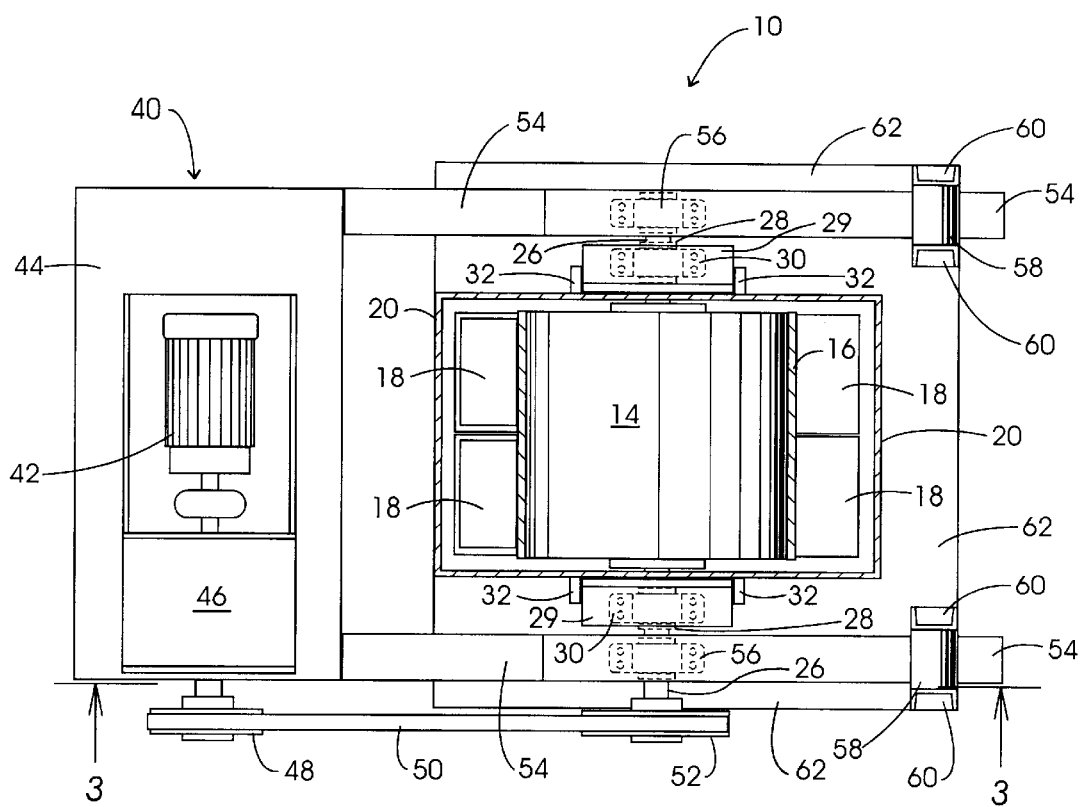
FIG. 2 is a plan section view taken at line 2—2 of FIG. 1.
Figure 3:
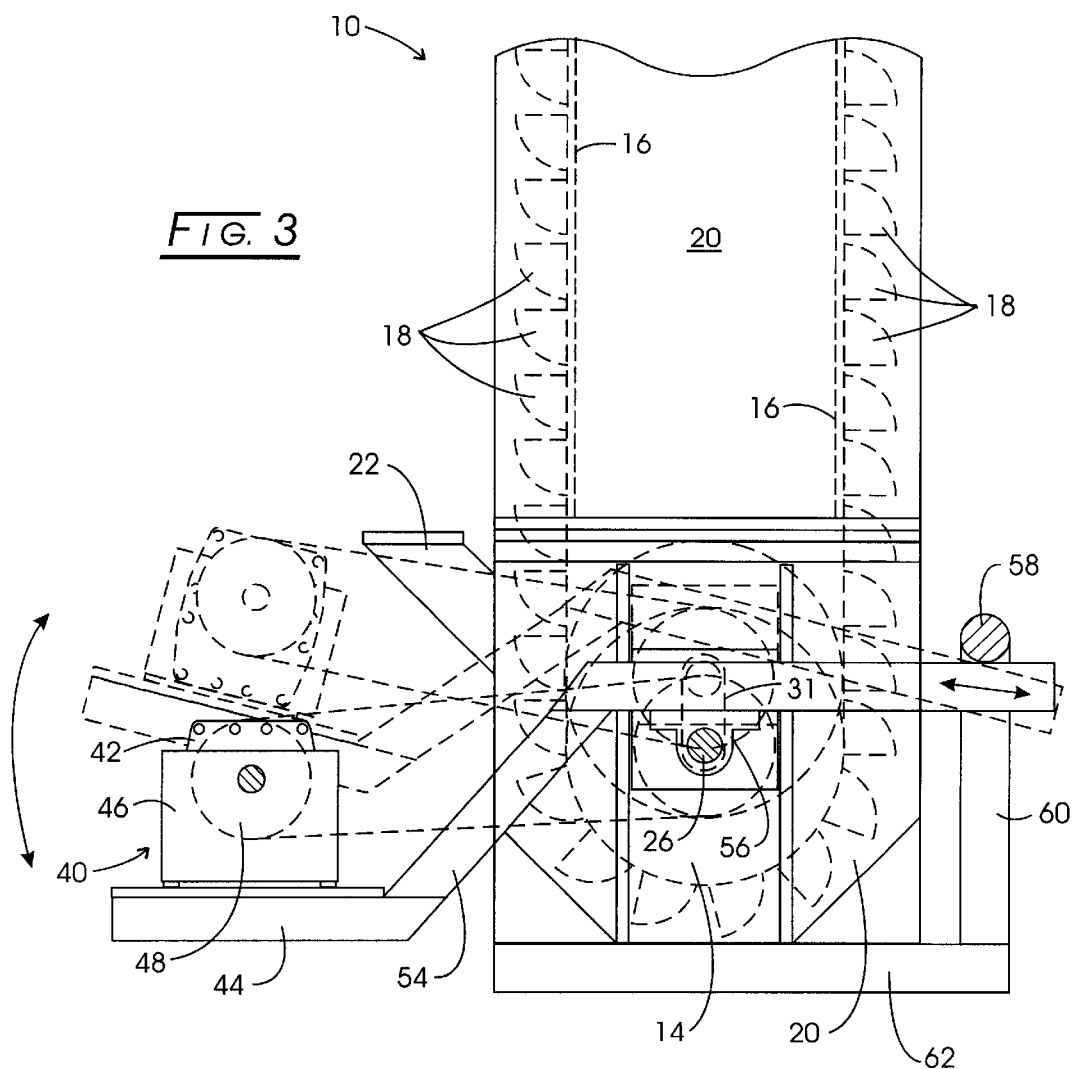
FIG. 3 is a section view taken at line 3—3 of FIG. 2.

FIG. 1 schematically illustrates a preferred embodiment of the bucket elevator apparatus of the present invention which is referenced as 10 in the drawings, and which is essentially comprised of: upper or head pulley 12; lower or boot pulley 14; endless belt 16 having material-carrying bucket element 18 attached thereto and co-operating with pulleys 12 and 14; and housing 20 that encloses elements 12 through 18 and that is provided with material supply inlet 22 and material discharge outlet 24. Referring to FIGS. 2 and 3, boot pulley element 14 is mounted on a shaft 26 that is guided by conventional roller bearings 28 in pillow blocks 30 mounted to slide 29. Shaft 26 is guided within slot 31 formed in housing 20. Pillow blocks 30 are free to float relative to housing 20 but only in upward or downward vertical directions within slot 31 because of the restriction effected by their co-operation with fixed guide elements 32 mounted on housing 20. Apparatus 10 also includes the primary drive 40 that rotatably powers boot pulley element 14 to cause movement of pulleys 14 and 12 and endless belt 16 in the directions shown by the directional arrows of FIG. 1.

As more clearly shown in FIG. 2, primary drive and belt take-up 40 is basically comprised of electric motor 42 rigidly mounted on platform lever 44, and having its motor output shaft connected to boot pulley shaft 26 successively through gear reduction unit 46, gear reducer drive sprocket or drive sheave 48, endless chain or V-belt 50, and drive sprocket or drive sheave 52 which is keyed or otherwise rotationally secured to boot pulley shaft 26. Platform element 44 carries an attached pair of rigid lever arm elements 54 that carry bearing element pillow blocks 56 on their underside. Pillow blocks 56 support boot pulley shaft 26. Lever arm elements 54 contact and co-operate with cylindrical fulcrums 58. Each end of fulcrum 58 is supported by one end of a vertical channel member 60 which is affixed to and projects upwardly from elevator base 62.

Thus, principally due to the weight of electric motor 42 (which in practice often is a 150 or larger horsepower electric motor) and platform lever 44 and its attached arms 54, primary drive and take-up 40 applies longitudinal belt-tensioning forces to boot pulley 14 as well as rotational forces. When platform 44 and attached lever arms 54 are automatically pivoted about fulcrums 58 to accommodate changed tensioning requirements for endless belt 16, the attached arms 54 will slide longitudinally relative to fulcrums 58 because of the consequently-changed position of boot pulley shaft 26. Arms 54 must move longitudinally relative to fulcrums 58 because boot pulley shaft 26 only can move vertically in fixed guide elements 32.

Various changes may be made to the configurations, proportionate sizes, placements, and materials of construction of the invention elements described herein without departing from the scope, meaning, or intent of the claims which follow.

I claim as my invention:

1. In a bucket elevator having a head pulley rotatably supported by a head pulley shaft, a boot pulley rotatably supported by a floating boot pulley shaft, and a bucket-carrying, flexible, endless belt co-operating with said head and boot pulleys, a primary drive and belt-tensioning means operatively connected to the boot pulley shaft, and comprising:

a fixed-position fulcrum element;

a rotatable platform lever element contacting said fixed-position fulcrum element and urging the bucket elevator floating boot pulley shaft in a vertically downward direction; and a motor element mounted on said rotatable platform lever and having an output shaft connected to said floating boot pulley shift in driving relation, the weight of said motor element causing rotation of said platform lever element and the bucket elevator floating boot pulley shaft vertically downardly and about said fixed position fulcrum element in response to elongation of the bucket elevator bucket-carrying, flexible, endless belt.

2. The bucket elevator invention defined by claim 1, and wherein said rotatable platform lever element urges the bucket elevator floating boot pulley shaft vertically downwardly through an intermediately co-operating rotational bearing assembly.

3. The bucket elevator invention defined by claim 1, and wherein said motor element output shaft is connected to the bucket elevator floating boot pulley shaft though a gear reduction unit and co-operating sprocket and gear belt elements.

4. The bucket elevator invention defined by claim 1, and wherein said motor element and said platform lever element are rotated vertically upwardly about said fixed fulcrum element in response to a reduction in the operational belt tension of the bucket elevator bucket-carrying, flexible, endless belt.

\* \* \* \* \*